(12) United States Patent
Lin et al.

(10) Patent No.: US 8,397,065 B2
(45) Date of Patent: Mar. 12, 2013

(54) SECURE CONTENT BASED ROUTING IN MOBILE AD HOC NETWORKS

(75) Inventors: Yow-Jian Lin, Edison, NJ (US); Narayanan Natarajan, Marlboro, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 955 days.

(21) Appl. No.: 12/288,214

(22) Filed: Oct. 17, 2008

(65) Prior Publication Data

US 2011/0131411 A1   Jun. 2, 2011

Related U.S. Application Data

(60) Provisional application No. 60/999,241, filed on Oct. 17, 2007.

(51) Int. Cl.
*H04L 29/06* (2006.01)

(52) U.S. Cl. .................. 713/162; 713/160; 713/150

(58) Field of Classification Search .................. 713/162
See application file for complete search history.

(56) References Cited

U.S. PATENT DOCUMENTS

| | | | |
|---|---|---|---|
| 7,526,493 B2 * | 4/2009 | Betts et al. .............................. 1/1 |
| 7,716,525 B1 * | 5/2010 | Buchko et al. ................... 714/22 |
| 7,886,146 B2 * | 2/2011 | Fascenda et al. ............. 713/160 |
| 2004/0230618 A1 * | 11/2004 | Wookey ........................ 707/200 |
| 2007/0067409 A1 * | 3/2007 | Eslambolchi et al. ........ 709/217 |
| 2007/0156870 A1 * | 7/2007 | McCollum .................... 709/223 |

OTHER PUBLICATIONS

Alex C. Snoeren, Kenneth Conley, David K. Gifford, Mesh-based content routing using XML, Proceedings of the eighteenth ACM symposium on Operating systems principles, Oct. 21-24, 2001, Banff, Alberta, Canada.*
Stallings, William. Cryptography and Network Security: Principles and Practices. 3rd ed. Prentice Hall, 2003. Print.*

* cited by examiner

*Primary Examiner* — Kambiz Zand
*Assistant Examiner* — Imhotep Durham
(74) *Attorney, Agent, or Firm* — Philip J. Feig

(57) ABSTRACT

Methods and systems for information dissemination in mobile ad hoc networks founded on Content Based Routing. The method comprises encoding, via an encoding logic within the source node, a plurality of information categories associated with the content in a header of the packet, encrypting the packet with an encryption key unique to the plurality of information categories, with the encrypted packet having a unique dissemination group identity in its header, and disseminating the encrypted packet to nodes that have subscribed to the data based on the dissemination group identity. The system comprises a host within the source node, an identity generator to generate the dissemination group identity for the content, an encryption unit for encrypting the content, and a routing unit to disseminate the content to the dissemination mesh based on established subscriptions.

29 Claims, 5 Drawing Sheets

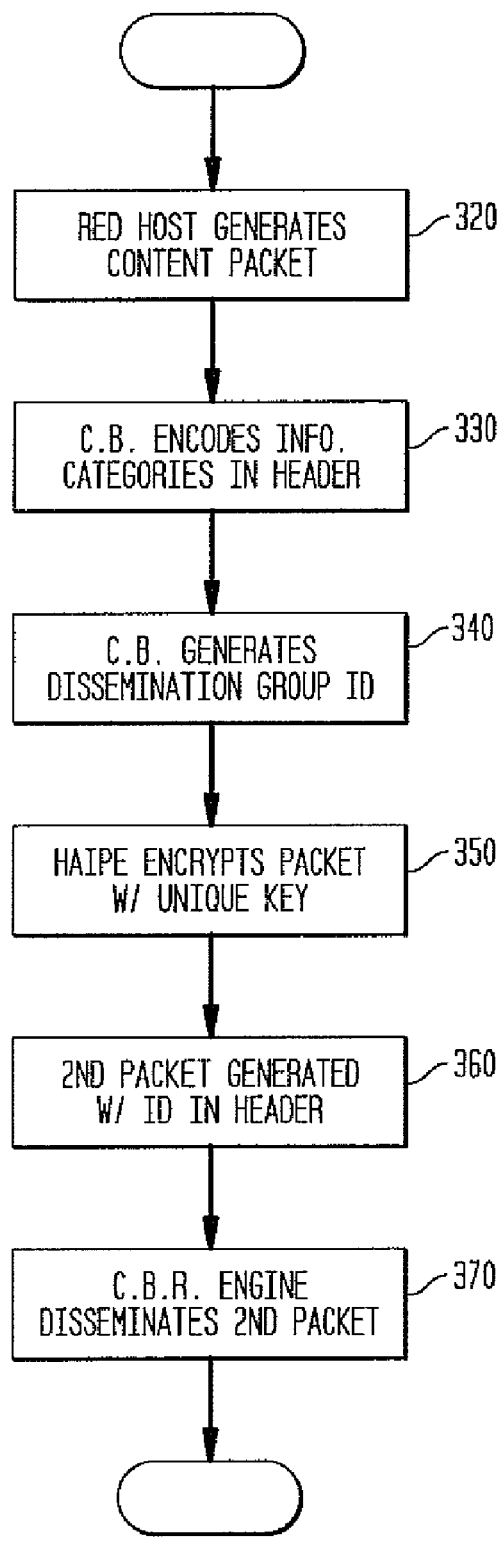

QUERY PROPAGATION:
Sink1

CONSTRUCTED
MESH FOR Sink1

QUERY PROPAGATION:
Sink2

CONSTRUCTED MESH FOR
Sink1 AND Sink2

SECURE CONTENT BASED ROUTING IN MOBILE AD HOC NETWORKS

CROSS REFERENCE TO RELATED APPLICATION

This application claims the benefit of U.S. Provisional Patent Application 60/999,241, filed Oct. 17, 2007, the entire contents and disclosure of which is incorporated herein by reference.

BACKGROUND

1. Field of the Invention

The present invention relates to mobile ad-hoc networks. Specifically, the present invention provides systems and methods to securely disseminate content in a tactical mobile ad-hoc network.

2. Background of the Invention

Information superiority in future network centric warfare in urban and other environments requires bandwidth efficient dissemination of relevant data to the right person at the right time enabling a common operational picture among all actors within the theater of operation. In the context of future force multi-tier tactical mobile ad hoc networks, the data to be continuously disseminated include command and control data, sensor data, common operational picture data and mission plan updates.

Many layers of security measures present a challenge to content based information dissemination, for instance, the data encryption/decryption at the IP layer. Since the information disseminating source does not know in advance the set of final destination nodes or "sinks", it needs to encrypt the data in such a way that all potential destination nodes can decrypt them. Moreover, since intermediaries need to know something about the content, the source and/or the sink in order to make forwarding decisions, certain encoding (via encoding logic) of these data needs to be visible in the content packet header to the intermediaries.

Multicast is a common mechanism for a data source to send information to a dynamic set of data sinks (recipients) that have expressed interests in receiving the data. It requires a well known multicast address being allocated to each multicast group, a mechanism for data sinks to join a multicast group, probably with authorization; and a routing mechanism for forwarding data packets to all members of a multicast group. A general approach to the encryption/decryption problem in secure multicast is to let all members of each multicast group share a symmetric key. That is, there will be one key for each multicast group. It is also commonly assumed that each group is assigned a unique key in order to prevent non-members from accessing the group data.

The key management could become a complicated process, depending on whether multicast groups are pre-identified (static group) or created on the fly (dynamic group), and/or whether group membership is fixed (static group membership) or changing dynamically (dynamic group membership). In particular, since only a limited number of keys will be available for use with dissemination traffic in tactical environments, one needs to use the keys wisely to protect the most critical aspects of data privacy and integrity. Moreover, since dynamic key distribution is a complicated process, any key management approach must minimize re-keying without sacrificing the flexibility of forming many ad hoc (unplanned) dissemination groups during mission execution.

Furthermore, efficient utilization of limited radio resources has always been a major issue in information dissemination in mobile ad hoc networks. Most proposed techniques for efficient bandwidth utilization, such as information caching, aggregation and filtering, often require intermediate nodes to examine packet contents, which is problematic for security reasons in tactical networks due to end-to-end packet encryption at various protocol layers.

Another important aspect is the consideration of Red (plain text) and Black (cipher text) separation in tactical radios and the design of content based routing and information dissemination taking into account this separation. Although the concept of establishing dissemination paths on demand based on receiver subscriptions has been described in the context of sensor networks, the prior art has not addressed receiver subscriptions in the context of radio receivers, for instance within a tactical mobile ad-hoc network. Addressing to unplanned groups is also a challenge.

Thus, there exists a need for an efficient secure routing mechanism for data packets in a tactical mobile ad-hoc network.

SUMMARY OF THE INVENTION

The present invention includes methods and systems for information dissemination in mobile ad hoc networks that is founded on the following principles. Content Based Routing—routing is based on information needs of nodes and content markup contained in packet headers, instead of multicast addresses. A dissemination mesh protocol is presented for forming a packet propagation mesh with two-tier forward filtering; i.e., a coarse filtering at intermediaries to facilitate route aggregation vs. a detailed content filtering for host delivery at local area networks (LANs) within a node. Differentiated grouping concepts provide a relatively stable grouping of content in terms of content entitlement, and assignment and administration of keys to nodes based on these entitlements, versus a more dynamic content dissemination grouping to support flexible data subscription Further, the dissemination mesh protocol described in this paper enables incorporation of efficient bandwidth utilization techniques while establishing forwarding paths for content based routing. Further, the dissemination mesh scheme works across the Red-Black boundary.

In one exemplary embodiment, the present invention is a method for securely disseminating a data packet, the method comprising generating a first data packet at a source node, encoding, via an encoding logic within the source node, a plurality of information categories associated with the first data packet in a header of the first data packet, encrypting the first data packet with an encryption key unique to the plurality of information categories, generating a second data packet having a unique dissemination group identity in its header and the encrypted first data packet as a payload of the second data packet, disseminating the second data packet across a dissemination mesh, and receiving the second data packet at a destination node.

The method further comprises preprogramming the encoding logic and the encryption key among a plurality of destination nodes, such that the destination nodes can decrypt and decode the first data packet. The dissemination mesh comprises a plurality of intermediate nodes that are unable to decrypt or decode the data packet.

The method further comprises receiving at one of the plurality of intermediate nodes a content request packet from a destination node, said content request packet having, in a header of the content request packet, a dissemination group identity corresponding to a requested content, and an origin of the content request packet. The method further comprises storing the dissemination group identity in a memory within the intermediary node and forwarding the content request packet to the dissemination mesh, and discarding the content request packet if the dissemination group identity already exists in said memory.

The method further comprises receiving the content request packet at the source node, determining whether or not said first data packet is associated with the requested content in the dissemination group identity, and disseminating said second data packet associated with the requested content across the dissemination mesh.

The dissemination group identity may be one of a plurality of dissemination group identities corresponding to a plurality of requested contents, in which case the method further comprises modifying the content request packet by removing from the header of the content request packet the dissemination group identity corresponding to the requested content of the second data packet, and forwarding the modified content request packet across the dissemination mesh.

In another exemplary embodiment, the present invention is a method for securely disseminating data content across a network, the method comprising, generating at a node a first data packet, said first data packet having a first packet header comprising information related to a type of packet, a source, a destination, and a payload comprising the data content, storing a first record within a database at the node, said first record including the payload and the source, encoding a plurality of information categories within the first packet header, encrypting the first data packet with a unique encryption key, generating at the node a second data packet comprising the encrypted first packet and a second packet header, the second packet header comprising a dissemination group identity related to the encoded plurality of information categories and the unique encryption key, storing a second record within a second database at the node, said second record including the second packet header, and disseminating the second data packet out to a dissemination mesh in the network.

In yet another exemplary embodiment, the present invention is a system for securely routing a content from a source node to a destination node via a disseminating mesh in a mobile ad-hoc network, the system comprising, a host within the source node that generates a first data packet comprising a first packet header and the content within a first payload of the first data packet, an identity generator within the source node to receive the first data packet and to generate a dissemination group identity for a dissemination group, the dissemination group comprising all destination nodes entitled to receive the content, the identity generator comprising an encoding unit and an encryption unit, the encoding unit to encode within the first packet header a plurality of information categories associated with the content, the encryption unit for encrypting the first data packet with an encryption key unique to the information categories associated with the content, such that a second data packet is formed, the second data packet having in a second header the dissemination group identity and in a second payload the encrypted first data packet, and a routing unit to disseminate the second data packet to the dissemination mesh, wherein the dissemination mesh comprises a plurality of intermediate nodes for disseminating the second data packet based on the dissemination group identity within the packet header. The dissemination group identity is based on the encoded plurality of information categories and the encryption key, and the encoding unit and the encryption key is preprogrammed in the destination node, such that the destination node can decrypt and decode the data packet.

BRIEF DESCRIPTION OF THE DRAWINGS

FIGS. 3A-3B are a flowchart showing the content dissemination scheme via the red-black boundary, according to an exemplary embodiment of the present invention.

DETAILED DESCRIPTION OF THE INVENTION

Figure 1:
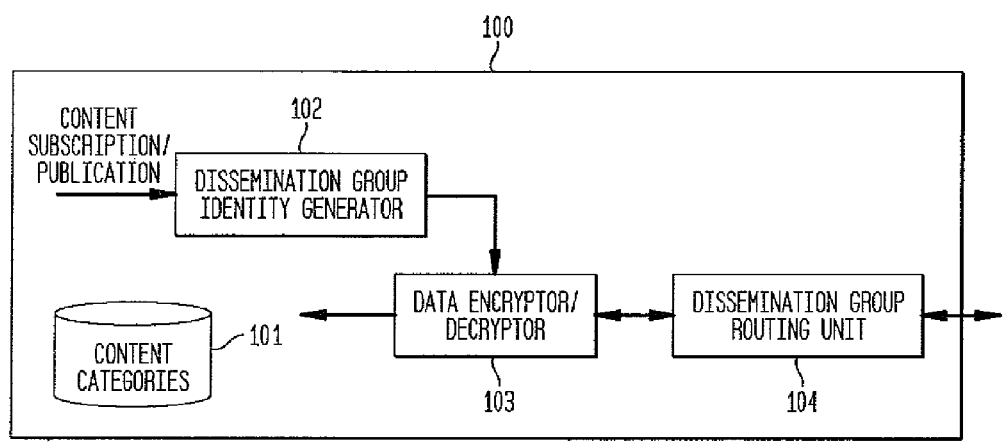
FIG. 1 shows the components of a content disseminating network entity, according to an exemplary embodiment of the present invention.

The present invention provides a secure content based routing approach for information dissemination in tactical networks. The method brings the characteristics of packet contents to the IP packet header, so that these efficient utilization techniques can be applied at as close to the IP layer as possible without revealing the actual contents to the intermediaries. According to the present invention, subscription is expressed in terms of information items. This is more general and flexible than dissemination based on multicast addresses, and avoids the problem of pre-deployment multicast address planning for dynamic engagement situations in battle fields. To be bandwidth efficient, the present invention establishes routing paths taking into account overlapping information needs of different nodes. Secure dissemination is ensured by separating the concerns of key management for trusted communication (entitlement grouping) from that of disseminating only specific information items that are of interest to recipients (dissemination grouping). The present invention facilitates entitlement based key management for protecting contents in packet payloads and content markup in packet headers for content based routing. The content markup enables intermediate forwarding nodes to employ efficient bandwidth utilization techniques without examining packet contents, thus reducing security vulnerabilities.

Dissemination according to the present invention employs content based routing. When a packet is received by a radio within a node, the radio may do one or more of the following forwarding actions: forward the packet to a host in the node, forward the packet to one or more radio neighbors, store the packet for a limited amount of time (e.g., for additional processing in conjunction with other packets), or drop the packet. The forwarding treatment that a packet receives at a (radio) node is based on content header information in the packet and the forwarding rules that have been previously established in the router through a dissemination protocol, further described below.

For the purposes of the present disclosure, it is assumed that there is a set of pre-defined content categories for categorizing data in an application domain. For example, ground sensor data, unmanned aerial vehicle swath images, and situation awareness data from a specific company are some illustrative content categories. The category structure could be hierarchical, and a packet of data could belong to multiple content categories.

A content request/subscription is a request for receiving data content, for instance an information item (described in terms of content category, and some attributes such as time and location constraints), e.g., ground sensor data from geographical area A and time T. A data packet is said to be relevant to a content request if the packet contains data of a content category described in the content request.

A packet can be relevant to more than one content request. The content header information in a packet encodes the content category or categories of the packet.

There is a distinction between entitlement and subscription regarding content requests. A node may be entitled to request for N information items but it may subscribe to receive a subset of them at any given time. Thus, entitlement is a more static concept, whereas subscription could change often. This leads to differentiating two grouping concepts: one is associated with the group sharing the same set of content entitlements (entitlement group), and the other is with the various dynamic groups formed by subscriptions to an information item (dissemination group).

FIG. 1 shows the components of a content disseminating network entity 100, or a node, according to an exemplary embodiment of the present invention. The entity 100 can be either a content source (publisher) or a content target (subscriber), or both. Elements 101-104 are functional components residing in network entity 100. Each network entity 100 maintains a set of content categories 101, the dissemination of which the network entity is entitled to participate in. The network entity 100 can subscribe to any subset of these content categories, and can publish contents in any content category 101 in the set if it is a source of the content. To subscribe to a content category 101, the network entity 100 issues a content subscription message, or a content request indicating the content category of interest. To publish contents, the network entity issues a content publication message or a content advertisement, in that it also indicates the category the content belongs to.

According to the present invention, content request packets travel from sink nodes to source nodes, content data packets from source nodes to sink nodes, and content advertisement packets go from hosts within a source node to the routing unit of the same node.

Content request and content advertisement packets pass through Dissemination Group Identity Generator 102 first, which generates a unique encoding as the routing identity of the said content category via encoding logic within the Dissemination Group Identity Generator 102. The identity generation can be as simple as one reflecting the static assignment of a multicast address to each content category. Alternatively, a parameterized encoding logic can be used to assign different group identities to the same content category subject to given parameter values. By distributing parameter values to only authorized participants of a content category, the associated dissemination group identity is available only to those authorized participants. Furthermore, the dissemination group identity can be changed dynamically, as opposed static and publicly known multicast addresses.

The Dissemination Group Identity Generator 102 enables changing group routing identity dynamically with a parameterized encoder for better protection. The Dissemination Group Identity Generator 102 also provides separation between names (content categories) and routing addresses (generated dissemination group identities), and enables group participants to address to the group using semantic names rather than syntactic addresses. Further, the concept of differentiating "entitlement groups" from "dissemination groups" facilitates dynamic publication or subscription of a subset of content categories without acquiring an individual key and authorization for each dissemination group, which simplifies key management and minimizes authorization overhead.

Data Encryptor/Decryptor 103 is responsible for communication data integrity by encrypting outgoing (and decrypting incoming) messages. Each encryption key is associated with a subset of content categories, also known as an "entitlement group". With the same key, a network entity 100 can dynamically engage in the dissemination of information items belonging to any content category in the corresponding entitlement group, each of which is also known as a "dissemination group". In a tactical environment with red/black separation, the Data Encryptor/Decryptor also performs red/black routing address translation, and functions similarly to a HAIPE device.

Dissemination Group Routing Unit 104 carries out operations for the network entity to join/leave dissemination groups. It also runs group communication protocol(s) to establish routing paths and perform forwarding actions.

Thus, forwarding behavior is not only based on destination/source addresses, but more importantly based on content. This enables two nodes to communicate without either being aware of the address of the other. An information source can send information to one or more sinks without knowing the address of any sink. Conversely, an information sink can receive information without explicit knowledge of any potential source, but by simply subscribing to the needed information. Thus, a publish-subscribe communication model is supported by the present invention.

In addition, the present invention enables a node to perform higher order (i.e., value-added) content processing functions that go beyond simple forwarding. These include caching, computation of derived content, determination of sinks for a content based on semantic relationships among information items, and sharing of network routes (dissemination paths) for overlapping needs of different sinks.

Furthermore, the present invention enables a node to disseminate the same content to different sinks with different priorities, and the priorities are determined using content header and forwarding context information in the node. Thus, criticality is not necessarily an intrinsic property of the content but can be a function of the characteristics of information sinks.

Secure Dissemination:

Content based information dissemination is similar to multicast communication. A request for receiving an information item is like joining a multicast group. The establishment of a dissemination mesh resembles the construction of multicast trees. This process is further described below. For the purposes of the present disclosure, it may be helpful to analogize a multicast group in content based routing with the dissemination group for an information item in the present invention. The present invention associates a key with each entitlement group. The present invention also avoids using explicit assigned group identities (analogous to multicast addresses) as the basis for group join requests. This prevents intermediaries and, more dangerously, eavesdroppers from reading what is being requested.

Figure 2:
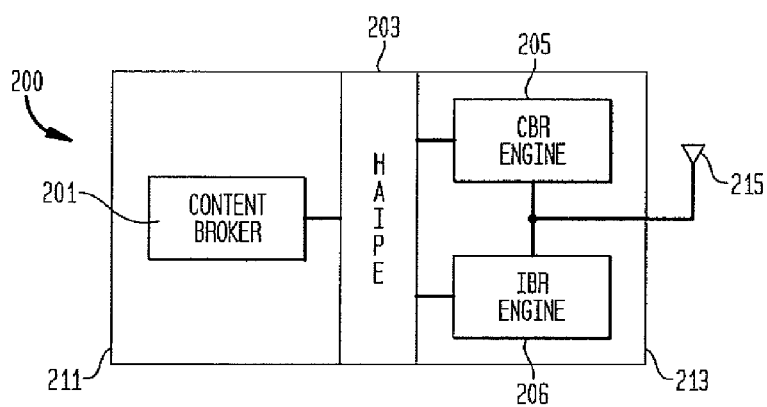
FIG. 2 depicts a mobile node architecture for secure content based dissemination in the context of red/black networks, according to an exemplary embodiment of the present invention.

FIG. 2 depicts a mobile node architecture 200 for secure content based dissemination in the context of red/black networks, according to an exemplary embodiment of the present invention. A HAIPE device 203 encrypts data coming from the red network 211 before sending the data to the black network 213, and decrypts data flow in the reverse direction.

At the black network 213, the architecture has engines to support both Content Based Routing (CBR) 205 and IP Based Routing (IBR) 206. The IBR Engine 206 can be a traditional IP based routing module at the IP layer and below, residing on the black network. Both CBR 205 and IBR 206 engines will most likely run on the same routing processor and share the Mobile Data Link (MDL) layer and below.

The CBR Engine 205 makes forwarding decisions on content requests and data packets based on the dissemination scheme described herein. The packets could be coming either from the red network 211 or in through radio 215. Upon receiving a packet, the CBR engine 205 decides whether it needs to send the packet to the red network 211, continue forwarding the packet to neighboring nodes, hold the packet, or drop it.

At the red network 211, a Content Broker (CB) 201, which could be one per each security enclave within the node (such as Unclassified, Secret, Top Secret), performs the following functions. First, it processes content requests coming from hosts in the red network, and forwards the processed requests to the CBR Engine 205 at the black network for request registration and propagation. Second, it encapsulates each content packet generated by hosts in the red network, attaches to it the corresponding content header information before sending to the CBR Engine 205. Finally, it delivers the content packets it received from the CBR Engine 205 to the hosts in the red network that have requested them.

The CB 201 works hand-in-hand with the HAIPE device 203 to perform several encoding and encapsulation functions. The CB 201 has encoding logic that can encode a set of content category identifiers into a unique representation of content encoding. This is both for creating a content encoding for matching based on content categories specified in a content request, and for generating a content encoding to be attached to each outgoing data packet. A simple form of the encoder is one that maintains a one-to-one mapping between content category identifiers and some bit patterns. The HAIPE device 203 uses the encryption key assigned to the corresponding entitlement group for encrypting/decrypting both data packets and content encoding.

The CB 201 maintains a list of content encoding of interests to nodes in the associated red network, whereas the CBR Engine 205 maintains the encrypted version (via HAIPE device 203) of each of the content encoding in the list for packet matching. The list of (encrypted) content encoding at the CBR Engine 205 is updated through content request messages initiated by the CB 201. Both the CB 201 and the CBR Engine 205 maintain their respective list of content encoding as a soft-state. Should it receive no matching packets of a content encoding for a period of time, the CBR Engine 205 will drop the content encoding from its forwarding context list. The CB 201 can issue a content request again to reestablish a dissemination path. When an entitlement group is re-keyed, the CB 201 needs to refresh the (encrypted) content encoding list maintained by the CBR Engine 205. The CB 201 at each node regenerates content requests based on the request tuples stored in its working space, the HAIPE device 203 encrypts the requests with a new key, and the CBR Engine 205 processes them as if they were new requests. The content encoding at the CBR Engine 205 that was encrypted with the old key will be discarded via soft-state timeout.

Figure 3A:
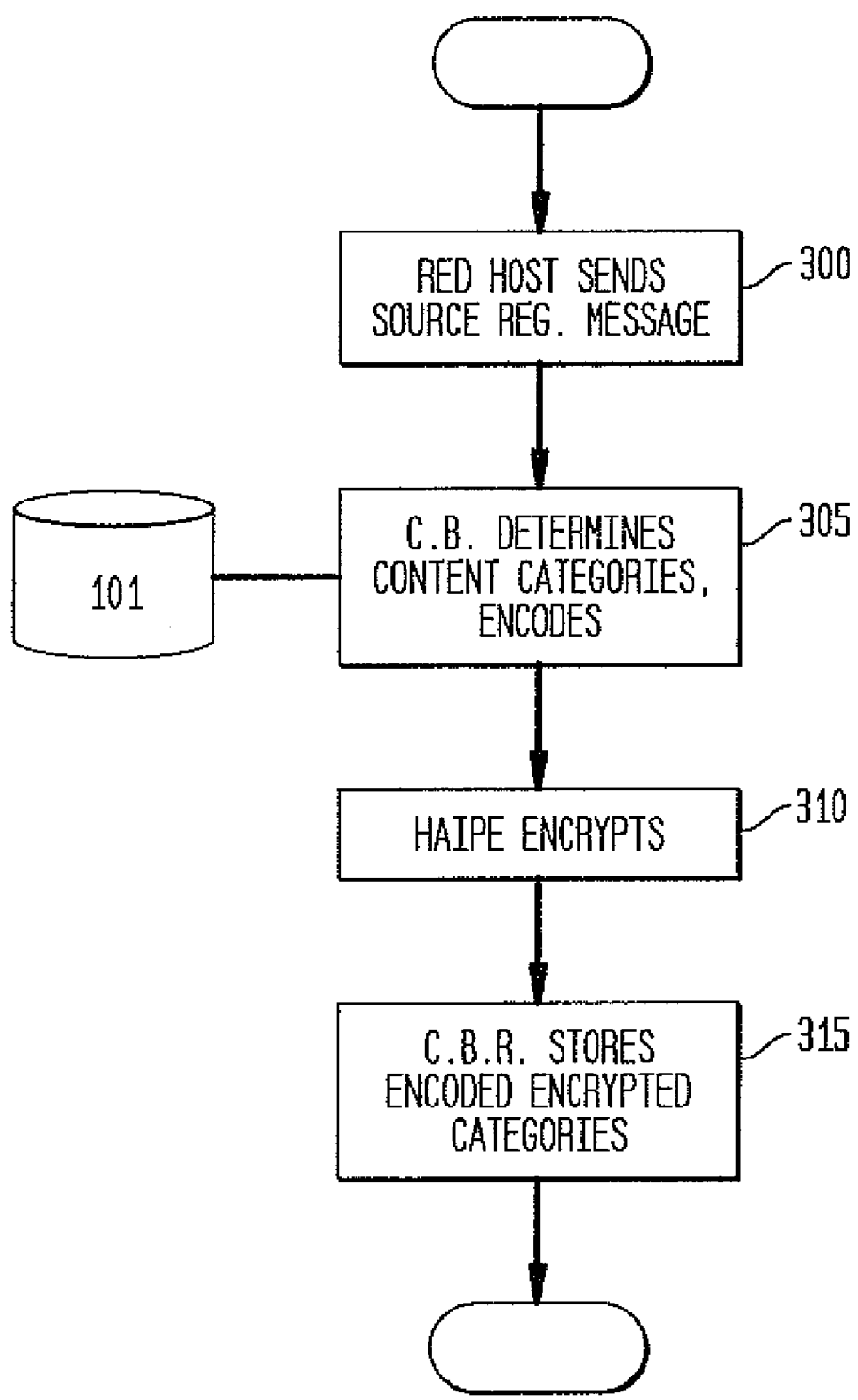

FIGS. 3A-3B show the content dissemination scheme via the red-black network boundary, according to an exemplary embodiment of the present invention. Any content source at the red network needs to identify itself to the CBR Engine. This is shown in FIG. 3A. A red host sends a source registration message (300) to the CB, which refers to category database 101 to determine the content categories that the host can serve as a source for. The Content Broker encodes (305) the content categories and passes the source registration message to the HAIPE for encoding (310), and then to the CBR which stores the header of the packet containing the encoded and encrypted categories (315).

When a content request from an authorized node (designated as part of a dissemination group) is received, the dissemination group ID in the content request packet is compared to the information at the CBR, and if the request is approved, the content is disseminated as shown in FIG. 3B. The host at the red network sends (320) the contents to the Content Broker. The Content Broker determines the content categories of the data in the packet, creates the corresponding content encoding (330), attaches the content encoding to the original packet and generates a dissemination group ID (340) to be stored as a header for the outgoing data packet (second data packet). The dissemination group ID is based on the content encoding and a n encryption key unique to the dissemination group. HAIPE device encrypts (350) the packet with the encryption key, and a second packet is generated (360) having the dissemination group ID as the header and the encrypted first packet as its payload. The CBR Engine grabs the now encrypted content encoding from the packet and makes its forwarding decision (370) according to the rules created by the dissemination mesh protocol.

The Content Broker encoding function (330) facilitates control on the granularity of dissemination path aggregation. Since the construction of each dissemination mesh is based on a unique encrypted content encoding, by encoding multiple content categories to a single representation the Content Broker effectively makes the content routing of those categories share one dissemination mesh.

The encrypted content encoding is a function of the encoding algorithm at the Content Broker and the encryption algorithm and key at the HAIPE device. Any differences in those three between the source and the sink nodes will result in different encrypted content encoding for the same information item. Consequently, content requests from the sink node will not be recognized by the CBR Engine at the source, and the content disseminated from the source node will not be consumed by the CBR Engine at the sink. Control of data dissemination is through forward filtering done first at CBR Engine (a coarse filtering for preventing irrelevant data packets coming into the node) and then at the Content Broker (a more refined publication/subscription). Since the dynamic dissemination group is implicitly defined by the encrypted content encoding, no additional encryption key is needed for each dynamic group.

Dissemination Mesh Protocol:

The objective of a dissemination protocol is to establish and maintain the forwarding contexts in network nodes to facilitate content based routing as described in the previous section. The present invention utilizes a dissemination mesh protocol, comprising a dissemination mesh among a set of network nodes. This dissemination mesh protocol has been described in co-assigned and co-pending U.S. patent application Ser. No. 11/709,069, the entire contents and disclosure of which is incorporated herein by reference. Briefly, each node represents a node in the ad hoc network, two nodes that are directly connected by an edge are radio neighbors, and an edge directed from a node A to another node B denotes that node A has established a forwarding context to forward messages concerning one or more information items to B.

The forwarding context within a node is a set of tuples of the form <I,N> where I denotes an information item (i.e., a variable), and N denotes a neighbor to which the node will forward a message concerning I when it either generates or receives the message. An information source may generate several messages concerning the same item over time.

A node that has no edge incident on it is a pure information source. A node that has no edge emanating from it is a pure information sink. All other nodes simultaneously act in one or more of the following roles: information source, information sink, and information intermediary.

Figure 4:
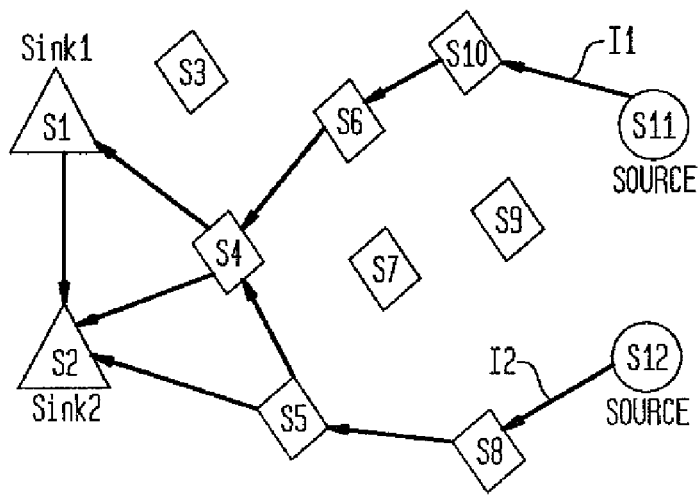
FIG. 4 shows a dissemination mesh according to an exemplary embodiment of the present invention.

FIG. 4 shows a dissemination mesh according to an exemplary embodiment of the present invention. Source nodes S11 and S12 produce information items I1 and I2 respectively. The dissemination mesh supports dissemination of data pertaining items I1 and I2 to two sinks S1 and S2. Nodes S3 through S10 are intermediary nodes. Some of the nodes in the network are not involved in the dissemination of I1 and I2.

The directed edges between the nodes represent the forwarding contexts established in each node, and are displayed in Table 1.

TABLE 1

Forwarding Contexts for each node in FIG. 4

S1: <I1,S2>; <I2,S2>
S2: none
S3: none
S4: <I1,S1>; <I2,S1>; <I1,S2>; <I2,S2>
S5: <I2,S4>; <I2,S2>
S6: <I1,S4>
S7: none
S8: <I2,S5>
S9: none
S10: <I1,S6>
S11: <I1,S10>
S12: <I2,S8>

According to the present invention, a node that desires to receive some information sends a request (subscription request or content request) to its neighbors identifying the information needed. This request is "smartly" propagated in the network towards a source or an intermediary that has already established a tuple in its forwarding context for the requested information. Although this example assumes that a request has only one information item, this is not a requirement. Handling requests with multiple items is subsequently described.

For instance, a node that receives a request for an item X, either discards it, terminates its propagation, or propagates it to its neighbors. If the node is a source for X or has X already in its forwarding context, it terminates the propagation of the query and adds a tuple <X, N> where N is the neighbor from which it received the request for X. If the node has already received the same request from a different neighbor (duplicate requests identified using the sequence number contained in the request), it discards the request. Otherwise, it propagates the request to its neighbors except the neighbor from which it received the request, and adds a tuple <X, N> where X is the item in the request and N is the neighbor from which it received the request for X. A node that forwards a request to its neighbors waits for a predefined period of time to receive the requested data, from any of those neighbors. If it does not receive the data within this time period, it removes from its forwarding context the tuple it created earlier when it propagated the request.

This allows for a highly efficient use of scarce network bandwidth (and energy power) since it does not require exchanges of Ack/Nack messages to construct meshes; it is a one-way approach from sinks to sources to construct meshes.

It is possible that a sink or an intermediary receives data about the same information item from more than one neighbor node in the mesh (redundancy is built in the mesh). For example, referring back to FIG. 4, node S2 receives data redundantly from multiple neighbors S1, S4, and S5. In such cases, node S2 may choose to receive data concerning the item only from one of the sources. The node S2 enforces this decision by sending a cancel message to the non-selected neighbors.

The protocol may be applied to handle requests that contain several items in the content request. A node may receive a request for a set of items X1, . . . , Xn. For each item Xi in the request, if the node is either a source for Xi or has Xi already in its forwarding context, it adds a tuple <Xi, N> where N is the neighbor from which it received the request, and removes Xi from the request. If the reduced request still has some items, it propagates the reduced request to its neighbors except the neighbor from which it received the request, and adds a tuple <Xi, N> for each Xi in the reduced request and associates a timer with the reduced request.

Figure 5A:
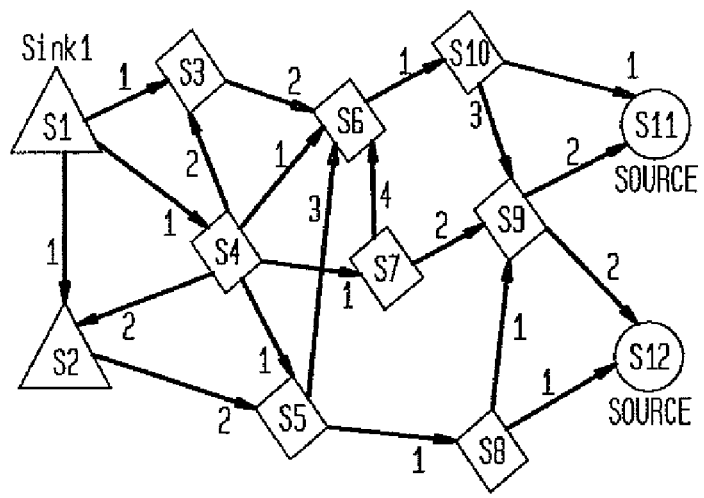
FIGS. 5a-5d illustrate the operation of the dissemination mesh protocol using two exemplary scenarios.

FIGS. 5a through 5d illustrate the operation of the dissemination mesh protocol using two exemplary scenarios. The figure shows the construction of a mesh initiated by Sink1 for two items, I1 and I2. In this example, S11 is the source for I1 and S12 is the source for I2. The numbers associated with the arrows indicate the "local" order in which the request (generated by Sink1) is received by a node. For example, FIG. 5a shows that S6 received the request first from S4, then from S3, then from S5, and then from S7; in this case, S6 creates a tuple in its forwarding context (with neighbor set to S4), propagates the query to its neighbors, and discards the requests received from S3, S5, and S7.

Figure 5B:
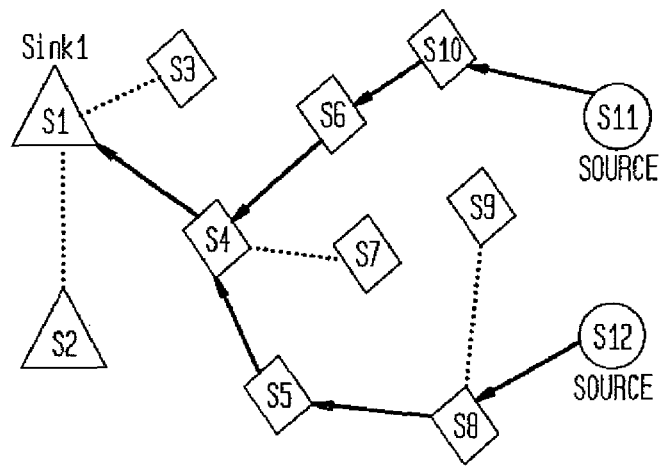

FIG. 5b shows the mesh (in this case a tree) constructed by the dissemination mesh protocol, where straight edges represent tuples in forwarding contexts that are used to disseminate data to Sink1. Dotted lines show forwarding context tuples that will be discarded (via timers) and are not used to transfer data.

Figure 5C:
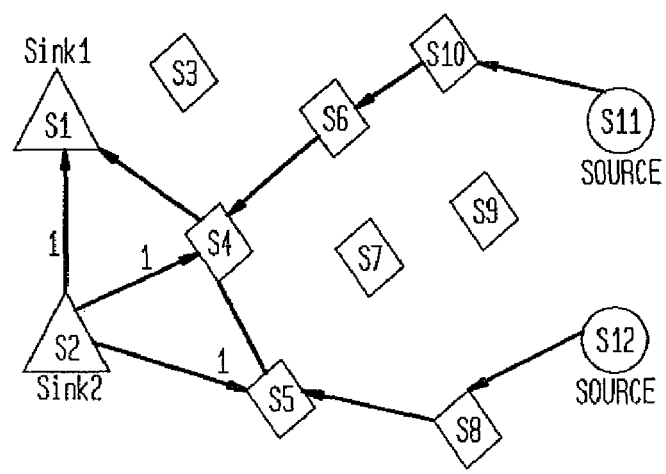

FIG. 5c shows the propagation of the request generated by Sink2 that is similar to that of Sink1. The request is received by S1, S4 and S5; all of them terminate the request propagation because they have already established forwarding tuples for the requested items.

Figure 5D:
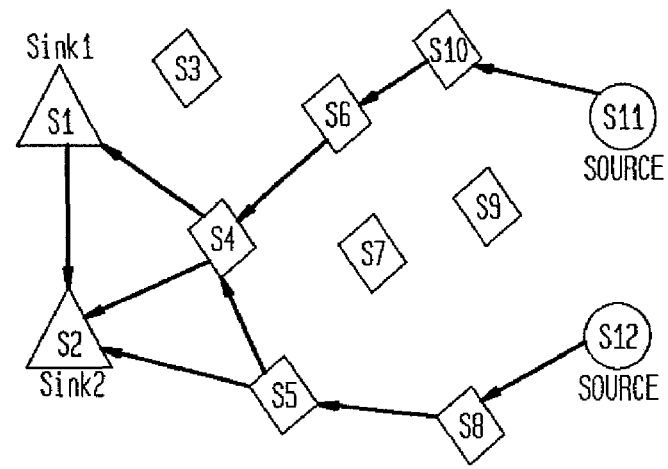

FIG. 5d shows the mesh resulting from the request generated by Sink2. Sink2 receives data from three nodes (S1, S4, and S5). It can enforce receiving data from S4 by sending a cancel message towards S1 and S5.

When topology changes arise as a consequence of node mobility or failure, the dissemination mesh has to be reconfigured. When a node detects a communication failure with one or more of its neighbors, it initiates mesh reconfiguration by (re)sending requests to its neighbors for information items in its forwarding context. It also deletes from its forwarding context those tuples associated with the nodes that it can no longer communication with.

Secure Dissemination Mesh:

Referring again to FIGS. 5a through 5d, secure dissemination can also be explained in the context of a dissemination mesh. Assume that each packet has the following important fields in its header: [Tag, Src, Dst, P]. Tag indicates whether the packet is a content data packet (CD), a content request packet (CR), or a content advertisement packet (CA). Src is the original source of the packet, Dst the destination of the packet, and P the packet payload. E(x) symbolizes the encrypted version of x, and H(y) the encoding of an information item y. The Src and/or Dst could be −1, which indicates the field is "don't care".

As described before, content request packets travel from sink nodes to source nodes, content data packets from source nodes to sink nodes, and content advertisement packets go from hosts within a source node to the CBR Engine of the same node. Dst field is −1 for content request packets, as the sink nodes which originate them do not know who the destination (source) nodes are. On the other hand, each content data packet has the targeted dissemination group identifier (an encrypted content encoding) in the Dst field. The Src field may be −1 for simplicity, or may carry specific source information and contribute to forwarding decisions.

Similar to the description of FIG. 4, a content request for a single information item is described. The scenario of a content request with multiple information items follows the same steps as being described earlier, and is omitted here.

When a host h1 inside node S1 sends out a content request packet [CR, h1, −1, I1], the Content Broker at S1, running on host cb, first stores the tuple <I1, h1> in its working space, then creates a new packet [CR, cb1, −1, H(I1)] and sends it through the HAIPE device. Out from the HAIPE device to the CBR Engine on S1 is a packet [CR, E(cb1), −1, E(H(I1))], which the CBR Engine processes according to the dissemination mesh protocol and records <E(H(I1)), E(cb1)> in its forwarding context. E(cb1) effectively is the corresponding black network address of the Content Broker at S1. When the CBR Engine forwards the content request packet out, it could replace it with its own address, or leave E(cb1) in.

When node S4 receives the packet, the CBR at S4 first puts <E(H(I1)), S1> in its forwarding context if the tuple is not there already. It then decides if it needs to forward the request packet according to the dissemination protocol. The S1 identification comes from the radio link layer.

In the mean time, assume some source host h2 at the red network of S11 has registered with the CBR at S11 (by sending [CA, h2, −1, I1], which the CB at S11 turns it into [CA, cb11, −1, H(I1)], and the HAIPE makes it [CA, E(cb11), −1, E(H(I1))]) to indicate that S11 can serve as the source of E(H(I1)). When a request [CR, −1, −1, E(H(I1))] arrives at S11, the CBR there updates its forwarding context. It also sends the request packet into the S11 red network via the HAIPE device, where the CB (i.e., cb11) can record the subscription.

When a host h2 at the S11 red network has data d_I1 of content category I1 to send, it forms a packet [CD, h2, −1, d_I1], which the CB recognizes it as about information item I1, creates a packet [CD, h2, H(I1), d_I1] and sends it through the HAIPE device. The HAIPE at S11 turns it into [CD, E(h2), E(H(I1)), E(d_I1)] before giving it to the S11 CBR for forwarding. The S11 CBR (as well as the CBR(s) at subsequent intermediary node(s)) then check for tuples about E(H (I1)) in its forwarding context to carry out the content based routing.

When the packet [CD, −1, E(H(I1)), E(d_I1)] arrives at node S1, the CBR at S1 recognizes that some host inside the red network of S1 is interested in E(H(I1)), so it forwards the packet into the red network through the HAIPE device. The CB at S1 retrieves the packet [CD, −1, H(I1), d_I1] and delivers it to host h1.

In the above example, E(H(I1)) is just a symbolic representation of information item I1 for content based routing. The intermediaries need not know that the packet is about I1; they only make routing decisions based on whether they have a tuple about E(H(I1)) in their forwarding context.

Table 2 refines the forwarding context shown previously, with details about source and sink (content request) registrations added. Each CB potentially has two lists of tuples, one for the sink registration and the other for the source. The sink and source registrations are also reflected respectively at CBR Engines. Upon re-keying, intermediaries will not have data to refresh the forwarding context at their respective CBR Engines. Rather, the forwarding context will be re-created by a new round of content request messages. The old forwarding context at intermediaries will time out eventually and be discarded.

TABLE 2

Forwarding Context at Content Brokers (CBs) and Content Based Routing (CBR) Engines

|  | Content Broker | Content Based Routing Engine |
| --- | --- | --- |
| S1 | Sink:<I1,h1>;<I2,hx> | <E(H(I1)),E(cb1)>;<E(H(I1)),S2>; <E(H(I2)),E(cb1)>;<E(H(I2)),S2> |
| S2 | Sink:<I1,hy>;<I2,hz> | <E(H(I1)),E(cb2)>;<E(H(I2)),E(cb2)> |
| S3 |  |  |
| S4 |  | <E(H(I1)),S1>;<E(H(I1)),S2>; <E(H(I2)),S1>;<E(H(I2)),S2> |
| S5 |  | <E(H(I2)),S4>;<E(H(I2)),S2> |
| S6 |  | <E(H(I1)),S4> |
| S7 |  |  |
| S8 |  | <E(H(I2)),S5> |
| S9 |  |  |
| S10 |  | <E(H(I1)),S6> |
| S11 | Source:<I1,h2> | <E(H(I1)),source>;<E(H(I1)),S10> |
| S12 | Source:<I2,hw> | <E(H(I2)),source>;<E(H(I2)),S8> |

Thus, the present invention provides a secure content based routing method for information dissemination in tactical mobile ad hoc networks. The method supports coarse-grain key management to protect data privacy and integrity with respect to content entitlement. At the same time, content based routing facilitates dynamic formation of dissemination groups based on fine-grain ad hoc content requests. Control of data dissemination is through forward filtering done first at CBR Engine (a coarse filtering for preventing irrelevant data packets coming into the node) and then at the Content Broker (a more refined publication/subscription paradigm for packet delivery). The dynamic dissemination group is implicitly defined by the encrypted content encoding and protected by the dissemination mesh protocol; no additional encryption key is needed for each dynamic group.

The present invention has been described herein with reference to certain exemplary and/or preferred embodiments. These embodiments are offered as merely illustrative, and not limiting, on the scope of the invention. Certain other alterations and modifications may be apparent to those skilled in the art in light of the present disclosure, without departing from the spirit or scope of the present invention, which is defined solely with reference to the following appended claims.

The invention claimed is:

1. A method for securely disseminating a data packet, the method comprising:
    generating a first data packet at a source node;
    encoding, via an encoding logic within the source node, a plurality of information categories associated with the first data packet;
    placing said encoding in a header of the first data packet;
    encrypting the first data packet with an encryption key unique to the plurality of information categories;
    generating a second data packet having a unique dissemination group identity in its header which is the encrypted form of the encoded plurality of information categories and the encrypted first data packet as a payload of the second data packet; and
    disseminating the second data packet across a dissemination mesh.

2. The method of claim 1, wherein the source node is a publisher of a data content within the first data packet, and a destination node is a subscriber of the data content.

3. The method of claim 1, further comprising:
preprogramming the encoding logic and the encryption key among a plurality of destination nodes, such that the destination nodes can decrypt and decode the first data packet.

4. The method of claim 3, wherein the dissemination mesh comprises a plurality of intermediate nodes that is unable to decrypt or decode the data packet.

5. The method of claim 4, further comprising:
receiving at one of the plurality of intermediate nodes a content request packet from a destination node, said content request packet having, in a header of the content request packet, a dissemination group identity corresponding to a requested content, and an origin of the content request packet.

6. The method of claim 5, wherein the dissemination group identity is one of a plurality of dissemination group identities within the header of the content request packet, said plurality of dissemination group identities corresponding to a plurality of requested contents.

7. The method of claim 6, further comprising:
storing the dissemination group identity corresponding to the requested, content in a memory within the intermediary node if the dissemination group identity does not already exists within the memory:
modifying the content request packet by removing the dissemination group identity that is stored in the memory from the header of the content request packet; and
forwarding the modified content request packet to neighbor nodes other than the neighbor from which the content request packet was received.

8. The method of claim 6, further comprising:
receiving the content request packet at, the source node;
determining whether or not said first data packet is associated with the requested content in the dissemination group identity; and
disseminating said second data packet associated with the requested content across the dissemination mesh.

9. The method of claim 8, further comprising:
modifying the content request packet by removing from the header of the content request packet the dissemination group identity corresponding to the requested content of the second data packet; and
forwarding the modified content request packet to neighbor nodes other than the neighbor from which the content request packet was received.

10. The method of claim 1, wherein the plurality of information categories comprises command and control data, sensor data, common operational picture data, mission plan updates, and data associated with a tactical mobile ad-hoc network.

11. A method for securely disseminating data content across a network, the method comprising:
generating at a node a first data packet, said first data packet having a first packet header comprising information related to a type of packet, a source, a destination, and a payload comprising the data content;
storing a first record within a database at the node, said first record including the payload and the source;
encoding a plurality of information categories within the first packet header;
encrypting the first data packet with a unique encryption key unique to the plurality of information categories;
generating at the node a second data packet comprising the encrypted first packet and a second packet header, the second packet header comprising a dissemination group identity, wherein the dissemination group identity is related to the encoded plurality of information categories and the unique encryption key;
storing a second record within a second database at the node, said second record including the second packet header; and
disseminating the second data packet out to a dissemination mesh in the network.

12. The method of claim 11, further comprising:
receiving the second data packet at an intermediary node within the dissemination mesh;
discarding the second data packet if the dissemination group identity does not exist in a memory within the intermediate node; and
forwarding the second packet if dissemination group identity exists in the memory within the intermediary node.

13. The method of claim 12, further comprising:
receiving the second data packet at a destination node;
decrypting the second data packet to retrieve the payload of the first data packet; and
decoding the payload.

14. The method of claim 11, further comprising:
receiving at an intermediate node a content request packet from a destination node, said content request packet having, in a header of the content request packet, the dissemination group identity related to the encoded plurality of information categories and the unique encryption key.

15. The method of claim 14, further comprising:
storing the dissemination group identity in a memory within the intermediary node and forwarding the content request packet to neighbor nodes other than the neighbor from which the content request packet was received; and
discarding the content request packet if the dissemination group identity already exists in said memory.

16. The method of claim 15, further comprising:
receiving the content request packet at the node of claim 11;
determining whether or not said first data packet is associated with the requested content in the dissemination group identity; and
disseminating said second, data packet associated with the requested content across the dissemination mesh.

17. The method of claim 16, wherein the dissemination group identity is one of a plurality of dissemination group identities within the header of the content request packet.

18. The method of claim 17, further comprising:
modifying the content request packet by removing from the header of the content request packet the dissemination group identity corresponding to the requested content of the second data packet; and
forwarding the modified content request packet to neighbor nodes other than the neighbor from which the content request packet was received.

19. The method of claim 11, wherein the plurality of information categories comprises command and control data, sensor data, common operational picture data, mission plan, updates, and data associated with a tactical mobile ad-hoc network.

20. The method of claim 11, further comprising:
generating at a source node a content advertisement packet;
encrypting and encoding the content advertisement packet;

forwarding the encrypted and encoded content advertisement packet to a routing mechanism within the source node; and recording an encrypted and encoded content advertisement packet header in a memory within the routing mechanism.

21. A system for securely routing a content from a source node to a destination node via a disseminating mesh in a mobile ad-hoc network, the system comprising:

a host within the source node that generates a first data packet comprising a first packet header and the content within a first payload of the first data packet;

an identity generator within the source node to receive the first data packet and to generate a dissemination group identity by encoding within the first packet header a plurality of information categories associated with the content;

an encryption unit for encrypting the first data packet with an encryption key unique to the plurality of information categories associated with the content, such that a second data packet is formed, the second data packet having in a second header an encrypted dissemination group identity, and in a second payload of the second data packet the encrypted first data packet; and a routing unit to disseminate the second data packet to the dissemination mesh, wherein the dissemination mesh comprises a plurality of intermediate nodes for disseminating the second data packet based on the, dissemination group identity within the packet header.

22. The system of claim 21, wherein the source node is a publisher of the content within the first data packet, and a destination node is a subscriber of the content.

23. The system of claim 22, wherein the dissemination group identity is based on the encoded plurality of information categories and the encryption key; and wherein the encoding unit and the encryption key is preprogrammed in the destination node, such that the destination node can decrypt and decode the data packet.

24. The system of claim 23, wherein one of the plurality of intermediate nodes receives a content request packet from the destination node, said content request packet having, in a header of the content request packet, the dissemination group identity corresponding to the content, and an origin of the content request packet.

25. The system of claim 24, wherein the dissemination group identity is one of a plurality of dissemination group identities within the header of the content request packet, said plurality of dissemination group identities corresponding to a plurality of requested contents.

26. The system of claim 25, further comprising a memory within the intermediary node for storing the dissemination group identity corresponding to the requested content if the dissemination group identity does not already exist within the memory, wherein the intermediary node modifies the content request packet by removing the dissemination group identity that is stored in the memory from the header of the content request packet, and forwards the modified content request packet to neighbor nodes other than the neighbor from which the content request packet was received.

27. The system of claim 25, wherein when the source node receives the content request packet, the encoding and encryption units within the source node determine whether or not the content request packet header includes a dissemination group identity associated with the content: and the routing unit forwards the second data packet associated with the dissemination group identity across the dissemination mesh.

28. The system of claim 27, wherein the source node modifies the content request packet by removing from the header of the content request packet the dissemination group identity corresponding to the requested content of the second data packet and forwards the modified content request packet to neighbor nodes other than the neighbor from which the content request packet was received.

29. The system of claim 21, wherein the plurality of information categories comprises command and control data, sensor data, common operational picture data, mission plan updates, and data associated with a tactical mobile ad-hoc network.

\* \* \* \* \*